United States Patent [19]
Schneider

[11] 3,884,898
[45] May 20, 1975

[54] NORMORPHINE DERIVATIVES BONDED TO PROTEINS

[75] Inventor: Richard S. Schneider, Sunnyvale, Calif.

[73] Assignee: Syva Company, Palo Alto, Calif.

[22] Filed: Aug. 18, 1972

[21] Appl. No.: 281,883

[52] U.S. Cl. ............... 260/121; 23/230 B; 195/63; 260/78 A; 260/112 R; 260/285; 424/12
[51] Int. Cl. .... C07g 7/00; G01n 27/78; G01n 33/16
[58] Field of Search ........................ 260/112 R, 121

[56] References Cited
UNITED STATES PATENTS

| | | | |
|---|---|---|---|
| 2,890,221 | 6/1959 | Rapoport et al. | 260/285 |
| 3,690,834 | 9/1972 | Goldstein et al. | 23/230 R |
| 3,709,868 | 1/1973 | Spector | 260/121 |

OTHER PUBLICATIONS

J. of American Chemical Society, Vol. 75, 1953, pp. 4963–4967, Clark et al.

Primary Examiner—Howard E. Schain

[57] ABSTRACT

Normorphine derivatives are provided for preparing compounds for use in immunoassays and for preparing antibodies to morphine. Carboxy functionalities or analogs thereof are bonded through an aliphatic chain to the nitrogen of the normorphine molecule. Accurate and selective immunoassays are obtained by employing derivatives having detector groups with the antibodies prepared to the normorphine derivatives.

4 Claims, No Drawings

NORMORPHINE DERIVATIVES BONDED TO PROTEINS

BACKGROUND OF THE INVENTION

1. Field of the Invention

Immunoassays have been finding wide application for assaying for physiologically active materials. By employing naturally occurring receptors, one is frequently capable of assaying for a class of compounds, a small group of compounds and in many instances, a single compound, where a number of other compounds may be present of similar and/or dissimilar structure. Among the most popular naturally occurring receptors for immunoassay are antibodies. Since a large number of compounds which are of interest for assaying are not antigenic, but rather haptenic, it is usually necessary to modify the compound of interest, so as to be able to bond the compound to an antigenic protein. The hapten modified protein may then be introduced into an animal for production of antibodies to the hapten.

In modifying the hapten to introduce an active functionality, one must consider a wide variety of potential problems. The modification of the hapten must occur in such a way that antibodies which are formed will recognize the hapten itself. In addition, it may or may not be desirable that the antibody recognize one or more metabolities of the hapten. Also, where the assay is performed by the naturally occurring haptan and the hapten bonded to the detector competing for antibody sites, it is essential that the bridging group between the hapten and detector allows for such competition.

The group introduced must not interact in a detrimental way with the hapten for the purposes of forming antibodies. The bridging group should be capable of being activated, so as to be reactive with both protein and the detector: it is normally preferable to have the same linking group bonded to the protein antigen employed for formation of the antibody, as bonded to the detector for formation of the hapten bound to detector. Finally, the bridging group must not be detrimental to the recognition of the modified or unmodified hapten by the antibody under the conditions employed by the assay.

In the morphine immunoassay, it is desirable to be able to distinguish between morphine and codeine. In many areas of the world, codeine is readily available. Therefore, where the antibody has high binding constants to both codeine and morphine, one could not determine by an assay of a biological fluid whether morphine or codeine had been ingested.

2. Description of the Prior Art

O-carboxymethylmorphine and an immunoassay technique employing radioactive atoms is described in Spector, et al., Science, 168, 1347 (1970). A description of an immunoassay technique employing stable free radicals is described in U.S. Pat. application Ser. Nos. 105,535, filed Jan. 11, 1971 and 141,516, filed May 10, 1971. For a description of an immunoassay technique employing enzymes, see U.S. Pat. application Ser. No. 143,609, filed May 14, 1971. See also Clark, et al., J. Am. Chem. Soc., 75, 4963 (1953) which discloses the ethyl esters of normorphine acetic and propionic acid and normorphine acetamide. $O^3$-[N'-(3'-[1',1',5',5'-pyrrolidinyl-1-oxyl]carbamoyl)methyl] morphine has been sold commercially for use in immunoassays.

SUMMARY OF THE INVENTION

Novel non-oxo-carbonyl substituted normorphine derivatives are employed for preparing derivatives of polypeptides for use in forming antibodies for morphine. The antibodies are useful in immunoassays for detection of morphine. The substituted normorphines are also useful for conjugation with detector systems for use in immunoassays. The combination of the derivatives or radioactive morphine and antibodies provides for an accurate selective immunoassay.

DESCRIPTION OF THE SPECIFIC EMBODIMENTS

The subject compositions are non-oxo carbonyl (including derivatives) substituted normorphines, the carbonyl or carbonyl derivative being linked to amine nitrogen by a divalent hydrocarbon group of from 1 to 7 carbon atoms. The derivatives of the non-oxo carbonyl include the mixed anhydride with carbonate the carboxylic acid, thio and amino analogs of non-oxo-carbonyl and a wide variety of amides, and their thio and amino analogs. The amides will be primarily derived from synthetic or naturally occurring polypeptides. The non-oxo carbonyl derivative can be used to prepare amides of detector molecules—enzymes and free radical amines—for use in immunoassays.

The compounds of the invention as well as products prepared therefrom will have the following formula:

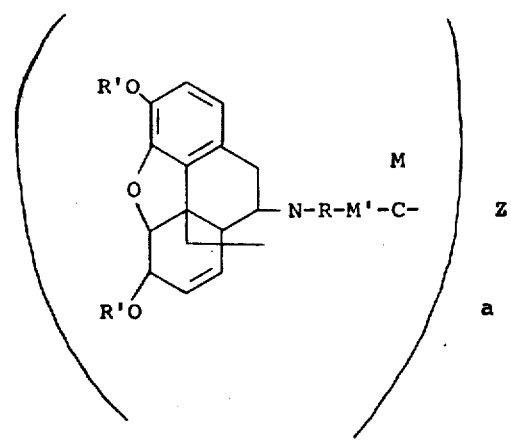

wherein R is a divalent group having 0 to 1 heteroatom (oxygen or nitrogen, with nitrogen bonded solely to carbon) normally aliphatic hydrocarbon, having from 0 to 1 site of aliphatic unsaturation, e.g., ethylenic, having from 1 to 7 carbon atoms; preferably from 1 to 4 carbon atoms; and may be straight chain or branched chain, usually straight chain, or if branched, having not more than two branches, usually methyl;

the two R's are the same or different and are hydrogen or acyl of from 1 to 2 carbon atoms;

M' is a bond, but when M is chalcogen (O,S) may be imino (—$NR^1$—), wherein $R^1$ is hydrogen or may be taken together with Z to form a bond between M' and C to form a nitrilo (—N=);

M is oxygen (=O), sulfur (=S) or imino (=$NR^2$), wherein $R^2$ is hydrogen or lower alkyl (1–6 carbon atoms, preferably 1–4 carbon atoms) and usually hydrogen;

*a* is at least one and may be greater than one when Z is a polypeptide polyamine;

Z is oxy (hydroxyl or hydrocarbyloxy of from 1 to 6 carbon atoms), except when M is oxygen, Z is hydroxy; alkyl carbonate ($-OCO_2R^3$, wherein $R^3$ is alkyl of from 1 to 6 carbon atoms, usually 2 to 4 carbon atoms); Y, wherein Y is a polypeptide residue there being one or more normorphinyl groups bonded to Y, Y differing from the parent polypeptide by having a number of free valences on amino nitrogen equal to *a*; or —NH—X, where X is a stable free radical group, usually a stable cyclic nitroxide. When Z is Y the number of acyl groups bonded to the amino groups of Z will be at least one and not greater than the number of amino groups present in the parent polypeptide of Z, usually less than the total number of amino groups present in the polypeptide.

When M' is imino there are at least two carbon atoms between the nitrogen atoms.

When Z is a polypeptide, *a* will range from 1 to about the molecular weight of Z divided by 500, usually 1,500 on the average. Generally, *a* will range from 1 to 500, usually from 2 to 250.

While the particular stereochemistry of the normorphine molecule is not indicated, it is intended that the naturally occurring stereochemistry will be employed.

For the most part, the compounds of the invention and the products prepared therefrom will have the following formula:

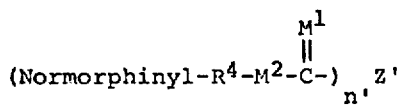

Normorphinyl is of the formula:

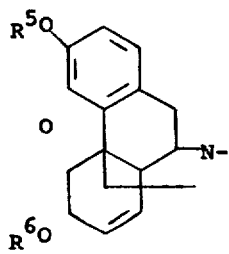

wherein $R^5$ and $R^6$ are hydrogen or acyl of from 1 to 2 carbon atoms, usually hydrogen;

$R^4$ is hydrocarbon, usually aliphatic, having from 0 to 1 site of ethylenic unsaturation, and of from 1 to 6 carbon atoms, usually of from 1 to 4 carbon atoms;

$M^2$ is a bond, or when $M^1$ is chalcogen, $NR^1$, wherein $R^1$ may be taken together with Z' to form a bond between the nitrogen and the carbon atoms to which they are respectively attached;

$M^1$ is oxygen, sulfur or imino; and

Z' is hydroxyl, alkoxy when M is other than oxygen, alkyl carbonate, (alkyl of from 1–6 carbon atoms) —N-H—X, wherein X is a stable free radical group, usually a stable cyclic nitroxide free radical, or Y wherein Y is a polypeptide residue; and

*n'* is one except when Z' is Y and is from 1 to the number of amino groups of the parent polypeptide of Y; *n'* will be on the average from 1 to not greater than the molecular weight of Y divided by about 1,000, usually 1,500.

Those compounds which are amides or analogs thereof will have the following formula:

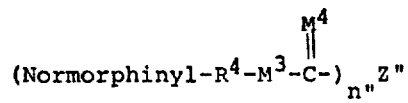

wherein Normorphinyl and $R^4$ have been defined previously;

$M^3$ is a bond or when $M^4$ is chalcogen may be an imino group;

$M^4$ is oxygen, sulfur or imino;

*n''* is at least one and not greater than the molecular weight of Z'' divided by about 1,500;

Z' is a polypeptide of at least 5,000 molecular weight, usually of at least 10,000 molecular weight having at least one amino group and usually greater than one amino group and bonded to the carboxyl group primarily through nitrogen or a stable free radical amine, usually a stable cyclic nitroxide free radical.

Those compounds which are employed for linking, either directly or indirectly employed, will for the most part have the following formula:

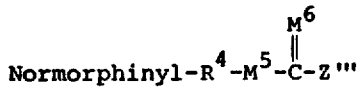

wherein Normorphinyl and $R^4$ have been defined previously;

$M^6$ is chalcogen (oxygen or sulfur), preferably sulfur, or imino;

$M^5$ is a bond or $NR^1$, where $R^2$ is taken together with Z''' to form a double bond, i.e. isocyanate and isothiocyanate; and Z''' is hydroxyl, alkoxycarbonate (alkyl of from 1 to 6 carbon atoms) or may be taken together with $R^1$ to form a double bond and may be alkoxy (1 to 6 carbon atoms) when Z''' is imino.

Illustrative compounds include N-carboxymethyl normorphine, N-(4-carboxybutyl) normorphine, 4-(N-normorphinyl) crotonic acid, then mixed anhydrides with monoethyl carbonate or monobutyl carbonate, methyl (N-normorphinyl)acetimidate, ethyl 3-(N-normorphinyl)propanimidate,3-(N-normorphinyl) propylisothiocyanate, 4-($O^3,O^6$-diacetyl N-normorphinyl) butylisothiocyanate and 2-($O^3,O^6$-diacetyl N-normorphinyl) ethylisocyanate.

The isocyanate compounds will have the following formula:

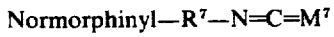

wherein Normorphinyl has been defined previously, $R^7$ is aliphatic hydrocarbon (hereinafter referred to as "aliylene"), usually saturated, having from 2 to 6 carbon atoms, usually 2 to 4 carbon atoms, there being at least two carbon atoms between the nitrogen atoms; and $M^7$ is chalcogen (O,S).

The iminoester will have the following formula:

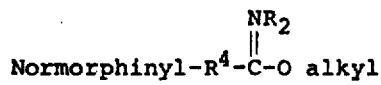

wherein all the symbols have been defined previously and alkyl is of from 1 to 6 carbon atoms.

The carboxylic acid (Z=OH) will for the most part have the following formula:

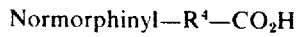

Normorphinyl—$R^4$—$CO_2H$ wherein $R^4$ is aliylene of from 1 to 6 carbon atoms, more usually of from 1 to 4 carbon atoms, and preferably of from 2 to 4 carbon atoms, having from 0 to 1 site of aliphatic unsaturation, usually ethylenic; and normorphinyl has been defined previously.

Illustrative groups for $R^4$ are methylene, ethylene, propylene, propenylene, hexamethylene, butylene, butenylene, methylethylene, and methylpentylene.

Usually, the two valences of the aliylene will be $\alpha$-$\omega$, being on the same carbon atom only when $R^4$ is methylene. Also, the double bond will usually be other than terminal. That is, the carbon atom bonded to nitrogen will be saturated.

The mixed anhydride which finds use in this invention will have the following formula:

Normorphinyl — $R^4$ — $CO_2CO_2R^8$ wherein $R^4$ is as defined previously and $R^8$ is alkyl of from 1 to 6 carbon atoms, more usually from 2 to 4 carbon atoms, e.g., ethyl, propyl, butyl, and hexyl.

Of particular interest are compounds where the non-oxo carbonyl substituted normorphine is bonded to an amino group which is part of a polypeptide structure. One group of polypeptides is antigenic, so that by bonding the non-oxo carbonyl modified normorphine to the polypeptide, antibodies can be formed to the normorphine. A narrower class of polypeptides, which also can be used as antigens, but will not normally be used as such, are enzymes which are employed as the detector in an immunoassay system.

Polypeptides usually encompass from about 2 to 100 amino acid units (usually less than about 12,000 molecular weight). Larger polypeptides are arbitrarily called proteins. Proteins are usually composed of from 1 to 20 polypeptide chains, called subunits, which are associated by covalent or non-covalent bonds. Subunits are normally of from about 100 to 300 amino acid groups (~10,000 to 35,000 molecular weight). For the purposes of this invention, polypeptide is intended to include individual polypeptide units, or polypeptides which are subunits of proteins, whether composed solely of polypeptide units or polypeptide units in combination with other functional groups, such as porphyrins as in haemoglobin or cytochrome oxidase.

The first group of protein materials or polypeptides which will be considered are the antigenic polypeptides. These may be joined to the non-oxo carbonyl group of the modified normorphine through an amino group. The amide product can be used for the formation of antibodies to morphine. The polypeptide materials which may be used will vary widely, normally being from about 1,000 to 10 million molecular weight, more usually from 12,000 to 500,000 molecular weight.

There will be not more than about one normorphine group per 1,500 molecular weight of polypeptides, usually not more than one normorphine group per 2,000 molecular weight. There will be at least about one normorphine group per 500,000 molecular weight, usually at least one per 50,000 molecular weight. With intermediate molecular weight antigens (50,000 to 1,000,000) the number of normorphine groups will generally be from about 2 to 250, usually from 10 to 100. With low molecular weight antigens (1,000 to 5,000) the number of normorphine groups will be in the range of 1 to 10, usually in the range of 2 to 5, so that there may be as many as one normorphine per 500 molecular weight of polypeptide. Usually, the number of groups bonded to the polypeptide will be related to the number of available amino groups, e.g., the number of lysines present.

While the normorphine may be bonded through the non-oxo carbonyl group to hydroxyls or mercaptans which are present in the polypeptide, for the most part the bonding will be to amino, and, therefore, the compounds are described as amides. However, esters and thioesters may also be present.

Amino acids present in proteins which have free amino groups for bonding to the non-oxo carbonyl modified normorphine include lysine, arginine, histidine, etc. The hydroxylated and mercaptan substituted amino acids include serine, cysteine, and threonine.

Various protein types may be employed as the antigenic material. These types include albumins, serum proteins, e.g., globulins, ocular lens proteins, lipoproteins, etc. Illustrative proteins include bovine serum albumin, keyhole limpet hemocyanin, egg ovalbumin, bovine $\gamma$-globulin, etc. Small natural polypeptides which are immunogenic such as gramicidin may also be employed. Various synthetic polypeptides may be employed, such as polymers of lysine, glutamic acid, phenylalanine, tyrosine, etc., either by themselves or in combination. Of particular interest is polylysine or a combination of lysine and glutamic acid. Any synthetic polypeptide must contain a sufficient number of free amino groups, as, for example, provided by lysine.

The second group of polypeptides or protein molecules are the enzymes to which the non-oxo carbonyl modified normorphine may be conjugated. As indicated, the normorphine modified enzyme is useful for immunoassays. The immunoassay technique will follow in more detail.

Various enzymes may be used, such as peptidases, esterases, amidases, phosphorylases, carbohydrases, oxidases, and the like. Of particular interest are such enzymes as lysozyme, peroxidase, amylase, dehydrogenase, particularly malate dehydrogenase and mannitol 1-phosphate dehydrogenase, $\beta$-glucuronidase, cellulase, and phospholipase, particularly phospholipase C. The enzymes will usually have molecular weight in the range of $1 \times 10^4$ to $6 \times 10^5$, more usually in the range of $1.2 \times 10^4$ to $8 \times 10^4$.

There will usually be at least one normorphine per enzyme molecule and usually not more than one normorphine per 1,500 molecular weight, usually not more than one normorphine per 2,000 molecular weight. Usually there will be at least one normorphine per 50,000 molecular weight, and more usually at least one normorphine per 30,000 molecular weight.

Where the normorphinyl derivative is bonded to a polypeptide, there will be at least one normorphinyl group and usually at least two normorphinyl groups. With the enzymes the number of normorphinyl groups will generally be from 1 to 40, more usually 2 to 35. Usually there will be at least 2, more usually at least 3 normorphinyl groups per enzyme when the normorphinyl groups are randomly substituted.

The substituted polypeptides will for the most part have the following formula:

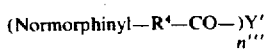

wherein Y' is a polypeptide residue.

Normorphinyl and R⁴ have been defined previously; and $n'''$ is a number of at least one. The ranges for $n'''$ have been indicated specifically for both antigenic and enzyme polypeptides previously.

Instead of an enzyme, a stable free radical may be employed as the functionality for detection in the immunoassay. The stable free radicals are cyclic nitroxides having the nitrogen of the nitroxide as an annular member and from 0 to 1 other heteroatoms, i.e., oxygen and nitrogen, as annular members. The molecules bonded to the non-oxo carbonyl will normally be of from 8 to 16 carbon atoms, more usually of from 8 to 12 carbon atoms. The amino functionality may be bonded directly to the annular carbon atom or may be bonded to the ring through an aliphatic chain of from 1 to 4 carbon atoms, more usually of from 1 to 2 carbon atoms. The molecules may have from 0 to 2 sites of ethylenic unsaturation, more usually from 0 to 1 site of ethylenic unsaturation.

For the most part, the stable nitroxide functionalities bonded to the carboxyl carbonyl of the carboxyl modified normorphine will have the following formula:

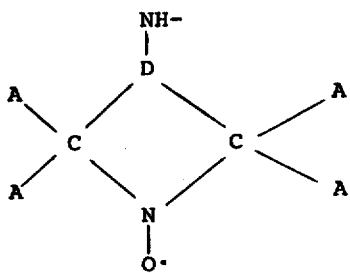

wherein D is a divalent aliphatic radical, usually aliphatically saturated, of from 1 to 6 carbon atoms, more usually of from 2 to 3 carbon atoms, only from 1 to 3, usually 2 to 3, of the carbon atoms in D being annular atoms and A is lower alkyl (1 to 6, usually 1 to 3 carbon atoms), particularly methyl. For the most part, compounds are pyrrolidine or piperidine derivatives.

Illustrative spin labeled compounds include N-(1-oxyl-2',2',5',5'-tetramethyl-3-pyrrolidinyl) 4-(N'-normorphinyl) butyramide, N-(1-oxyl-2',2',5',5'-tetraethyl-3'-pyrrolidinyl) 3-(N'-normorphinyl)proprionamide, N-(1-oxyl-2,2,6,6-tetramethyl-4-piperidinyl) (N'-normorphinyl)-acetamide, N-(1-oxyl-2,2,6,6-tetramethyl-4-piperidinyl)-(N'-normorphinyl)acetamidine, N-(1'-oxyl-2',2',5',5'-tetramethyl-3'-pyrrolidinyl) 3-(N'-normorphinyl propanamidine, and N-(1-oxyl-2,2,5,5-tetramethyl-3-pyrrolidinyl) N'-[(N''-normorphinyl)acetyl] urea.

The normorphine can be prepared by combining morphine, preferably with the hydroxyl groups protected, with cyanogen bromide under relatively mild conditions in a polar solvent, e.g., chloroform. The protective groups may then be removed to yield cyanonormorphine.

Alkaline hydrolysis of the cyanonormorphine, followed by treatment with acid yields normorphine.

To introduce the carboxyl group bonded to the nitrogen through an aliphatic chain, an active halo-substituted aliphatic carboxylic acid is employed. The halogen will normally be chlorine, bromine, or iodine, preferably bromine. The position of the halogen will be at the site of substitution and can be from α to ω.

Conveniently, the carboxyl group will be present as the salt, usually the alkali metal salt. These salts include lithium, sodium and potassium.

The reaction is carried out under relatively mild conditions, normally at temperatures in the range of about 25°–100° C., more usually in the range of about 35°–75° C, and in a polar, usually non-aqueous, solvent. Illustrative solvents include alkanols, ethers, etc. By employing the alkali metal salt of the carboxylic acid, the hydrohalide which is formed by the reaction between the amine and the halogen is neutralized to form the alkali metal halide salt and the carboxylic acid. Thus, the presence of significant concentrations of strong acid is avoided. Alternatively, the ester and an acid acceptor could be used, e.g., tertiary amine.

In conjugating the carboxy substituted normorphine with an amine, to form an amide, it is necessary to form an activated carboxylic acid. This can be achieved in a number of ways. Two ways of particular interest are the reaction with a carbodiimide, usually a dialiphatic of dicycloaliphatic carbodiimide in an inert polar solvent, e.g., dimethyl formamide, acetonitrile, and hexamethylphosphoramide.

The reaction is carried out by bringing the various reagents together under mild conditions and allowing sufficient time for the reaction to occur.

A second method is to form a mixed anhydride employing an alkyl chloroformate, e.g., isobutyl chloroformate. The mixed anhydride is formed by combining the carboxy substituted normorphine, with the hydroxyl groups protected, the alkyl chloroformate and a tertiary amine. The temperature is normally below ambient temperature. The mixture is then combined with the amino compound to be conjugated and the reaction allowed to proceed under mild conditions.

At least a stoichiometric amount of the chloroformate is employed based on the normorphine, and usually an excess. The excess does not usually exceed three times stoichiometric. The tertiary amine is present in at least equal molar amount with the chloroformate.

For preparing the other functionalities, a halonitrile may be substituted on the nitrogen of normorphine. To prepare the iminoester, the nitrile is treated with alkoxide under mild conditions. To prepare the isocyanates, the nitrile is reduced to the amine, followed by treatment with phosgene or thiocarbonylimidazole or thiophosgene under mild conditions according to known procedures.

After formation of the amide, any protecting groups which are bonded to the oxygen atoms of the normorphine may be removed by known procedures.

The following examples are offered by way of illustration and not by way of limitation.

(All temperatures not indicated are in Centigrade).

EXAMPLE I. CYANONORMORPHINE

Morphine (8.66 g) was acetylated with acetic anhydride (32 g) and pyridine (25 g) at room temperature overnight. After removal of the solvents by azeotroping with benzene, the residue was dissolved in dichloromethane, washed with saturated sodium chloride solution, 2.5% sodium carbonate solution, 2N-hydrochloric acid, and finally, saturated sodium chloride solution. Evaporation of the dichloromethane after drying over anhydrous sodium sulfate afforded heroin in a solid state (10.59 g) mp 169°–173°.

A mixture of heroin (10.59 g) and cyanogen bromide (4.3 g) in chloroform (43 ml) was heated at 50° for 2 hours. The mixture was cooled in an ice water bath and then poured into ether (170 ml) and stirred for 15 minutes to give a white precipitate, which was washed with hot absolute ethanol (50 ml), and dried over phosphorus pentoxide yielding 8.02 g. of cyanonorheroin, mp 204°–241° (lit. mp 235°–237°).

Cyanonorheroin (8.02 g) was heated at 50° for 5 minutes in a solution of potassium hydroxide (3.0 g) in 50% aqueous ethanol (50 ml). Addition of water (180 ml) and then glacial acetic acid (8 ml) gave crystals of cyanonormorphine, which were collected on a filter, washed with water, and dried over phosphorus pentoxide in vacuo affording 6.4 g, mp 289° dec (lit. mp 288°).

EXAMPLE II. N-CARBAMOYLNORMORPHINE

Cyanonormorphine (15.4 g) was suspended in 6% hydrochloric acid (450 ml) and heated at 70° for 15 hours with continuous stirring. After being cooled, a precipitate was collected on a filter and dried yielding 14.8 g of N-carbamoylnormorphine, mp 268°. Recrystallization from water gave 10.7 g, mp 282° (1st crop), 0.5 g, mp 281° (2nd crop) and 0.5 g, mp 277° (3rd crop). The mother liquor was purified by column chromatography on silica gel (120 g). Elution with a 1:50 mixture of methanol and chloroform yielded an additional 1.2 g, mp 277.5° after crystallization with water. The yield was 79.4%. A crystal with mp 277.5° was used as an analytical sample.

Anal. Cald for $C_{17}H_{18}N_2O_4$: C, 64.95; H, 5.77; N, 8.91.

Found: C, 64.70; H, 5.84; N, 8.87.

EXAMPLE III. NORMORPHINE

N-Carbamoylnormorphine (1 g) was gently refluxed in 6% hydrochloric acid (30 ml) for 12 hours. The homogeneous solution obtained was treated with charcoal (200 mg) at 30° for 10 minutes. After removal of the charcoal, powdered anhydrous sodium carbonate was added carefully to the filtrate until the solution ceased foaming. Addition of 5% sodium carbonate solution brought the pH up to 7.5 to give light gray crystals in the filtrate. The crystals were collected, washed with cold water, dried over phosphorous pentoxide in vacuo, and afforded 860 mg, mp 277°, (lit. mp 276°–277°) of normorphine; yield, 97.7%.

EXAMPLE IV. N-CARBOXYMETHYLNORMORPHINE

A mixture of normorphine (9.4 g, 0.0347 mole) and powdered sodium bromoacetate (7.1 g, 0.0433 mole) in absolute methanol (175 ml) was gently refluxed for 12 hours, and then cooled to room temperature. Crystals were separated and filtered, washed with cooled water and dried to yield 6.0 g, mp. 246°. Recrystallization afforded an analytically pure N-carboxymethylnormorphine, 5.9 g, mp 269°–271°, yield, 75%.

Anal. Cald for $C_{18}H_{21}NO_6H_2O$: C, 62.42; H, 6.10; N, 4.03.

Found: C, 62.27; H, 6.12; N, 4.05.

EXAMPLE V. DIACETYL N-CARBOXYMETHYLNORMORPHINE

N-Carboxymethylnormorphine (500 mg) was treated with acetic anhydride (7 ml) and pyridine (7 ml) at room temperature overnight. After removal of the solvents, trituration of the residue with ether gave a crystalline solid (590 mg), mp 258°–9°. Recrystallization from a mixture of methanol and ether afforded an analytically pure diacetate (520 mg), mp 266°–8° C.

Anal. Cald. for $C_{22}H_{23}NO_7$: C, 63.91; H, 5.61; N, 3.39.

Found: C, 63.95; H, 5.53; N, 3.31.

EXAMPLE VI. REACTION OF DIACETYL-N-CARBOXYMETHYLNORMORPHINE WITH 3-AMINO-2,2,5,5-TETRAMETHYLPYRROLIDINE-1-OXYL a. Carbodiimide method

To a solution of diacetyl-N-carboxymethylnormorphine (411 mg, 0.954 mmole) in dry dimethylformamide (8 ml.) and acetonitrile (40 ml) was added 3-amino-2,2,5,5-tetramethylpyrrolidinyl-1-oxyl (193 mg, 1.14 mmoles) in acetonitrile (1 ml) and dicyclohexylcarbodiimide (228 mg, 1.14 mmoles) in acetonitrile (1 ml). The mixture was allowed to stir at room temperature for 20 hours. After removal of precipitates, the filtrate was condensed to leave an oil, which was shaken with a mixture of dichloromethane and water to extract the compound. The dichloromethane layer was purified by preparative TLC. The yellow band with $R_f$ 0.52 (silica gel, 5% methanol - 95% chloroform) was collected by cutting and extracted with methanol, and after removal of the solvent, the residue was dissolved in 50% aqueous ethanol containing potassium hydroxide (0.1 g), and heated at 50° C for 10 minutes. To the cold solution was added 2N hydrochloric acid to pH 8. Crystals separated out, 60 mg, which were recrystallized from aqueous ethanol, 57 mg (12.9%), mp 218°–221° C as an analytically pure sample of 3-[2-(N-normorphino)acetamido]-2,2,5,5-tetramethylpyrrolidine-1-oxyl.

Anal. Cald. for $C_{26}H_{34}N_3O_5$: C, 66.65; H, 7.31; N, 8.97.

Found: C, 66.56; H, 7.27; N, 8.70.

b. Mixed anhydride method

Diacetyl N-carboxymethylnormorphine (200 mg., 0.463 mmole) was dissolved in dry dimethylformamide (10 ml.) and cooled at 0° C. with stirring. To the solution was added dropwise isobutylchloroformate (127 mg., 0.926 mmole) and then triethylamine (93 mg., 0.926 mmole). After being stirred for 1.5 hours, 3-amino-2,2,5,5-tetramethyl-pyrrolidine-1-oxyl (145 mg., 1.39 mmoles) in dimethylformamide (0.5 ml.) was added and stirred at room temperature overnight, and then water (50 ml.) was added; the mixture was extracted with dichloromethane. The extracts were washed with water and dried. Evaporation of the solvent left an oil, which was treated by preparative TLC in the same manner as in method (a). The oil with $R_f$ 0.52 was obtained and further worked up in the same manner as in method (a) to afford yellow crystals (124 mg. mp. 218°–221°, 57% yield) which were identical with the above crystalline product in method (a).

EXAMPLE VII. CONJUGATION OF N-CARBOXYMETHYLNORMORPHINE TO BOVINE SERUM ALBUMIN a. To a suspended solution of N-carboxymethylnormorphine (250 mg., 0.74 mmole) in dry dimethylformamide (8 ml.) was added isobutylchloroformate (124 mg., 0.89 mmole) and triethylamine (92 mg., 0.89 mmole) with stirring at −15° C. After the mixture was continuously stirred and cooled below 0° for 1.5 hours, bovine serum albumin (426 mg., 0.37 mmole) in a cooled 0.7% sodium carbonate solution (100 ml.) was added gradually with stirring. After the mixture was stirred in the cold room for one day, it was then centrifuged (22 minutes, 4°, 15,500 rpm) to remove the white precipitate. The clear solution was dialyzed with distilled water (1 liter × 9 times) in the cold room for 3 days. Water was evaporated below 0° in vacuo to leave a fluffy white residue (450 mg.).

The degree of conjugation was determined as follows:

The U.V. was measured at 280 nm: $A^{280} = 1.06$ when the concentration W was 1.171 g/l.
Since $$A^{280} = \frac{(n \cdot \epsilon^{280}_{\text{N-CMNM}} + \epsilon^{280}_{\text{BSA}})W}{n \cdot MW_{\text{N-CMNM}} + MW_{\text{BSA}}}$$

where $n$ = number of haptens per molecule, $W$ = weight of protein conjugated (grams per liter) and $MW$ is the molecular weight of the hapten (N-CMNM) and protein (BSA).

| | | | | |
|---|---|---|---|---|
| $A^{280}$ | = 1.06 | $\epsilon^{280}_{\text{N-CMNM}}$ | = | 1,440 |
| $W$ | = 1.171 | $\epsilon^{280}_{\text{BSA}}$ | = | 41,600 |
| | | $MW_{\text{N-CMNM}}$ | = | 329 |
| | | $MW_{\text{BSA}}$ | = | 64,400 |
| $n$ | = | 16 N-carboxymethylnormorphine/molecule. | | | b. The reaction was done in the same manner as (a) using instead isobutylchloroformate (299 mg., 1.63 mmoles) and triethylamine (169 mg. 1.63 mmoles), which gave a less soluble residue (151 mg., $n = 38$) than (a).

EXAMPLE VIII. N-(γ-NORMORPHINYL)CROTONIC ACID a. To a solution of 1.5 g. (0.57 mole) normorphine in 50 ml. anhydrous ethanol is added 1.25 g. (0.065 mole) ethyl bromocrotonate, and the reaction is refluxed for 18 hours. The solvent is evaporated, the residue is dissolved in dichloromethane, and the organic solution is washed twice with dilute sodium hydroxide (pH 12). The aqueous phase is then acidified and extracted with dichloromethane. The solvent is evaporated to dryness to give a colorless oil.

b. To a suspension of ethyl N-normorphinylcrotonate (1.3 g) in 20 ml methanol and 20 ml water is added 5 ml 1M sodium hydroxide. The reaction is then stirred at 50° until the solution becomes homogeneous. The alcohol is evaporated under reduced pressure, the aqueous solution is acidified with 1N hydrochloric acid, and then extracted twice with chloroform. The organic extract is dried and evaporated to give γ-normorphinyl crotonic acid.

EXAMPLE IX. CONJUGATION OF N-CARBOXYMETHYL NOR-MORPHINE TO LYSOZYME

A solution of 34.2 mg N-carboxymethyl normorphine (100 μmoles) in 2.0 ml dry dimethylformamide is cooled to −15° under nitrogen. Isobutyl chloroformate (0.013 ml, 100 μmoles) is added in one portion and the solution is stirred at −5° to 0° for 45 minutes.

Lysozyme (120 mg, 50 μmoles) is dissolved in 10 ml. distilled water and cooled to 4°. The pH is adjusted to 9.6 with 0.05M sodium hydroxide. The reaction mixture is allowed to stir at 4° for 1 hour before being centrifuged (10 minutes at 12,000 rpm). The supernatant is dialyzed against water for 48 hours before it is studied for activity and inhibition. The insoluble pellet is dissolved in 10 ml 8M urea and dialyzed against water for 48 hours. Most of the inhibitable enzyme activity is found in the urea soluble fraction.

EXAMPLE X. N-CYANOMETHYL NORMORPHINE

A mixture of normorphine (9.4 g, 0.035 mole) and chloroacetonitrile (3.28 g, 0.043 mole) is refluxed in 100 ml absolute methanol for 18 hours. After cooling to room temperature the solid which crystallized is removed by filtration. The filtrate is concentrated to obtain a second crop of crystalline material.

EXAMPLE XI. N-METHOXYIMINOMETHYL NORMORPHINE

A solution of 1.0 g N-cyanomethyl normorphine and 0.010 g sodium methoxide in 10 ml methanol is allowed to stand overnight at room temperature. The solution is then saturated with carbon dioxide to destroy the catalyst and after 15 min. is filtered. The methanol is removed by evaporation and the residue is crystallized from methanol-ether.

The product is characterized by the loss of —CN absorption in the infrared and the appearance of a strong new band at 1680 cm$^{-1}$.

EXAMPLE XII. N-AMINOETHYL NORMORPHINE

To a solution of 1.5 g N-cyanomethyl normorphine in 10 ml dry benzene is added 5 ml of a solution of sodium bis(2-methoxyethoxy aluminum hydride (Red—Al) in benzene. The reaction mixture is refluxed under nitrogen for 24 hrs. before being cooled to room temperature. The excess reducing agent is decomposed by the cautious addition of aqueous sodium sulfate solution to the reaction mixture. The residue is extracted with benzene-ether and, after drying over magnesium sulfate, the organic phase is evaporated. The residue amine is not purified further.

EXAMPLE XIII. N-ISOTHIOCYANATOETHYL NORMORPHINE

To a solution of N-ethylamino normorphine (0.500 g) in 10 ml chloroform is added 5 ml water and 0.75 g potassium bicarbonate. A solution of thiophosgene (.200 ml) is added and the heterogeneous solution is rapidly stirred overnight. The phases are separated and the aqueous phase is washed once with chloroform. After drying over sodium sulfate, the organic phase is evaporated to a product which can be crystallized from methanol-ether and characterized by the I.R. (KB~) band at 2100 cm$^{-1}$ assigned to the isothiocyanate band.

In order to carry out the various assays, antibodies are prepared. The following is an illustrative procedure for preparing antibodies to the morphine conjugate to protein.

Antisera may be obtained as follows: The antigen of Example VII is dissolved in a saline solution (9 g/liter) at a 2 mg/ml concentration. Per 1.0 ml aliquot of the above solution introduced, there is introduced simultaneously 3 ml of Complete Freund's Adjuvant in homogenized form by means of a two-way needle. For subcutaneous injections, approximately 0.3 ml (antigen + Freund's solution) is injected per site and for intraperitonealy injections, approximately 0.4 ml is injected. The total dosage is about 4.0 ml per rabbit.

After 3 to 4 weeks, a booster shot is given intramuscularly consisting of 0.5 ml of the above saline solution and 0.5 ml of Complete Freund's Adjuvant. A period of 5 to 7 days is allowed to pass and the rabbit is bled by heart puncture.

When the desired amount of blood is collected, the blood is allowed to clot and the clot removed. The remaining solution is then centrifuged at 2,000 rpm for 10 minutes. The serum is collected free of loose red cells.

An equal volume of saturated amonium sulfate solution is added to the serum dropwise with stirring at 4° C. After standing for 1 hour at that temperature, the solution is centrifuged at 10,000 rpm for 15 minutes and the supernatant removed. The residue is suspended in as small a volume as possible of 1X PBS (phosphate buffered saline, see below for description), transferred to a dialysis bag and dialyzed overnight against 1X PBS pH 7.0. The residue in the dialysis bag is then isolated and frozen.

(To make 1 l. of 10X PBS combine 76.5 NaCl, 7.25 g. $Na_2HPO_4$ (anh.), 2.12 g. of $KH_2PO_4$ and 10.0 g. of $NaN_3$; make up to 1 liter with distilled water, and adjust pH to 6.5 with 1N HCl. The 1X PBS is obtained by diluting 10X (tenfold), the pH changing to 7.0 - 7.1 as a result of the dilution).

In order to carry out an assay, sheep were immunized with 30 mg. conjugate (16 morphine molecules/BSA) in 5 ml. saline/15 ml. Complete Freund's Adjuvant. Every 4 weeks a booster injection was given with the same amount of material and incomplete Freund's Adjuvant. The formation of antibodies was monitored and the animal bled before injection. The antibodies were harvested according to known procedures.

The spin labeled morphine (Example VI) was first dissolved in a few drops of ethanol, and then dissolved in water to provide a solution of 5.4 × 10$^6$M concentration. A solution of the γ-globulin was prepared having 4.8 × 10$^{-6}$M concentration of γ-globulin, based on binding sites, and 1.08M in borate buffer, pH 8. Equivolumes of the two solutions were combined to provide a spin labeled morphine to antibody site ratio of 1.15:1. The final concentration of spin labeled morphine was 2.7 × 10$^{-6}$M.

The solution could be spiked with varying amounts of morphine or codeine, and the percent mobilization for the spin labeled morphine determined.

What one is looking at, is the change in spectrum as a result of the spin labeled morphine being bound to the antibody as compared to the spin labeled morphine being free to rotate in solution. The amount of spin labeled morphine which is free to rotate in solution will be dependent on the amount of morphine or codeine which can competitively compete for the antibody binding sites. By establishing a curve employing known standards, one can determine the amount of the material being assayed by relating the percent mobilization to the standard curve.

In carrying out the assay, to 10 μl of the combined γ-globulin - spin label solution, is added 20 μof a drug solution. In the subject assay, a synthetic solution is being employed rather than a naturally occurring solution such as urine. With urine, it is frequently desirable to add a small amount of oxidant to destroy any reductants present in the urine. For example, with urine, one could add about 2.5 μl of 0.2M sodium dichromate.

The urine sample to be assayed would first be mixed with the dichromate, and the resulting solution then added to the γ-globulin - spin label solution. After adding the sample to the γ-globulin - spin label solution, a capillary tube may be used for stirring the solution, and then allowing the solution to rise into the tube aided by capillary forces. The tube is wiped, sealed, and then read in the electron spin resonance spectrometer. The entire procedure normally takes about 35 seconds.

Following the procedure described above, the amount of codeine required to provide the aproximately minimum mobilization observable above background was determined with a number of different γ-globulins. These γ-globulins were obtained with two different animals and in a series of bleeds. The following table indicates the binding constant of the γ-globulin, the mobilization achieved with 0.4 μg of morphine and the ratio of codeine to morphine to achieve the same amount of mobilization with codeine as achieved with 0.4 μg of morphine.

TABLE I

| ANIMAL | I | | | |
|---|---|---|---|---|
| | γ-Globulin | | % Mobilization | Ratio |
| BLEED | Binding Site Concentration × 10$^{-5}$ | Binding constant × 10$^6$ | by 0.4μg morphine | Codeine / Morphine |
| 1 | 6.75 | 21 | 9 | 446 |
| 2 | 4.35 | 9 | 11 | 246 |
| 3 | 3.1 | 7 | 10 | 185 |
| ANIMAL | II | | | |
| | γ-Globulin | | % Mobilization | Ratio |
| BLEED | Binding Site Concentration × 10$^{-5}$ | Binding constant × 10$^6$ | by 0.4μg morphine | Codeine / Morphine |
| 1 | 10 | 13 | 9 | 143 |
| 2 | 5.5 | 27 | 9 | 233 |
| 3 | 5.1 | 17 | 9 | 354 |

Cross reactivity was determined in the same manner with a wide variety of drugs having a similar conformation or comparable physiologic activity to morphine. The following table indicates the percent mobilization at various concentrations for each drug. Where the percent mobilization is 5 or below, one is at the borderline of the background mobilization. Therefore, at these concentrations, the antibody would not recognize these drugs. In effect, these drugs do not have cross-reactivity with morphine. For those having higher than background mobilization, there would be some cross-reactivity, although it would take a much higher concentration of hydromorphone, for example, than morphine to provide significant mobilization.

TABLE II

| DRUG | CONCEN-TRATION µg/ml | ANIMAL BLEED | I | | | II | | |
|---|---|---|---|---|---|---|---|---|
| | | | 1 | 2 | 3 | 1 | 2 | 3 |
| Hydromorphone | 90 | | 20 | 23 | 23 | 20 | 12 | 17 |
| Demerol | 250 | | 1 | 5 | 1 | 2 | 2 | 1 |
| Darvon | 1150 | | 5 | 7 | 4 | 7 | 3 | 3 |
| Methadone | 310 | | 4 | 6 | 6 | 6 | 2 | 3 |
| Thorazine | 320 | | 5 | 4 | 3 | 2 | 2 | 2 |
| Morphine N-oxide | 42 | | 5 | — | — | 15 | 11 | 16 |
| Nalorphine | 42 | | 49 | 48 | 55 | 41 | 33 | 31 |
| Dextromethorphane | 1000 | | — | — | | 8 | 3 | |

The assay with the enzyme is carried out as follows: A buffer solution is prepared 0.025M in Tris-maleate at a pH of 6.0. A normorphine-lysozyme conjugate solution is prepared by combining a 0.1 weight percent solution of bovine serum albumin (BSA) in the buffer with the conjugate at a concentration which provides a rate of lysis of $0.210 \pm 0.020$ OD/min. A substrate solution for the lysozyme is prepared by suspending 30 mg of Micrococcus lysodeikticus in 50 ml of the buffer.

To carry out the assay 0.2 ml of the bacterial suspension is introduced into a sample flask. To the suspension is added 20 λ of antibody solution (0.025M Tris-maleate buffer, pH 7.4, 20 λ inhibits 92-96% of lysozyme activity of 0.5 ml of the above conjugate solution), 80 λ of the unknown sample and 0.5 ml of enzyme solution. The mixture is then aspirated into a spectrometer (Gilford 300 N) and the decrease in optical density measured at 436 nm for a fixed period in the range of 10 to 60 seconds. The concentration of morphine may then be read from a standard curve. If the rate is too slow or too fast, concentration or dilution of the unknown sample is employed.

It is evident, from the above results, that by employing a carboxyl substituted normorphine derivative, antibodies having high binding constants and high specificity for morphine as compared to closely related analogs - oxygen substituted analogs - can be prepared and utilized in immunoassays. Furthermore, the products prepared with the normorphine derivatives can be used in assays to distinguish between the metabolic product, morphine glucuronide and morphine itself. Therefore, one is provided with a method for determining how much morphine is metabolized and how much passes into the urine without being metabolized to the glucuronide. Also, codeine and morphine can be readily distinguished.

Although the foregoing invention has been described in some detail by way of illustration and example for purposes of clarity of understanding, it will be obvious that certain changes and modifications may be practiced within the scope of the invention, as limited only by the scope of the appended claims.

What is claimed is:

1. A normorphine derivative of the formula:

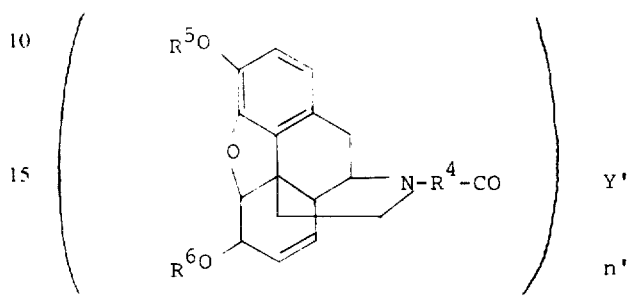

wherein $R^4$ is alkylene of from 1-6 carbon atoms;
$R^5$ and $R^6$ are hydrogen or acyl of from 1-2 carbon atoms;
Y' is an antigenic polypeptide residue; and
n' is from 1 to 250;
wherein said polypeptide residue is bonded through amide linkages.

2. A normorphine derivative according to claim 1, wherein n' is at least one and in the range of the molecular weight of Y' divided by from 1,500 to 50,000.

3. A normorphine derivative according to claim 1, wherein $R^4$ is alkylene of from 1-4 carbon atoms; and $R^5$ and $R^6$ are hydrogen.

4. A compound of the formula:

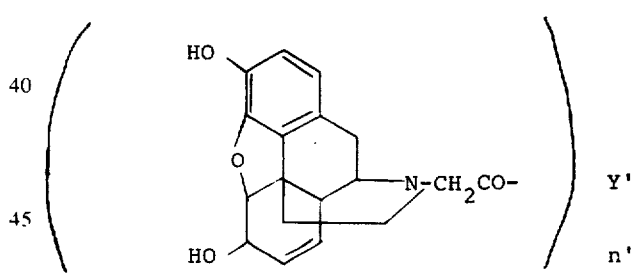

wherein n' is the range of from 2 to 45 and Y' is a bovine serum albumin residue,
wherein Y' is joined through amide linkages.

* * * * *